United States Patent
Richardson et al.

(10) Patent No.: US 12,219,504 B2
(45) Date of Patent: Feb. 4, 2025

(54) LOCALIZATION USING REPEATED TRANSMISSIONS OF ELECTROMAGNETIC SIGNALS FOR MOBILE AD HOC NETWORKS

(71) Applicant: Raytheon Company, Waltham, MA (US)

(72) Inventors: James J. Richardson, Temecula, CA (US); Gregory W. Heinen, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 1231 days.

(21) Appl. No.: 16/525,240

(22) Filed: Jul. 29, 2019

(65) Prior Publication Data

US 2023/0199677 A1 Jun. 22, 2023

(51) Int. Cl.
| | |
|---|---|
| H04W 64/00 | (2009.01) |
| G01S 11/12 | (2006.01) |
| G01S 11/16 | (2006.01) |
| G01S 13/87 | (2006.01) |
| H04W 4/02 | (2018.01) |
| H04W 56/00 | (2009.01) |
| H04W 84/18 | (2009.01) |

(52) U.S. Cl.
CPC ........... *H04W 56/001* (2013.01); *G01S 11/12* (2013.01); *G01S 11/16* (2013.01); *G01S 13/87* (2013.01); *H04W 4/023* (2013.01); *H04W 56/002* (2013.01); *H04W 64/00* (2013.01); *H04W 84/18* (2013.01)

(58) Field of Classification Search
CPC . H04W 56/001; H04W 4/023; H04W 56/002; H04W 64/00; H04W 84/18; G01S 13/87
See application file for complete search history.

(56) References Cited

U.S. PATENT DOCUMENTS

| | | | |
|---|---|---|---|
| 9,705,561 B2 | 7/2017 | Henry et al. | |
| 9,787,412 B2 | 10/2017 | Henry et al. | |
| (Continued) | | | |

FOREIGN PATENT DOCUMENTS

| | | | | |
|---|---|---|---|---|
| EP | 3419325 B1 * | 11/2020 | .............. | G01S 11/00 |
| EP | 3783839 A1 * | 2/2021 | ......... | G06Q 10/0833 |

OTHER PUBLICATIONS

International Search Report and Written Opinion of the International Searching Authority dated May 26, 2020 in connection with International Patent Application No. PCT/US2020/022978, 15 pages.

(Continued)

*Primary Examiner* — Lakeram Jangbahadur (57) ABSTRACT

A method includes transmitting a first electromagnetic signal from a first node to a second node and receiving a second electromagnetic signal from the second node at the first node. The method also includes repeating the transmission of the first electromagnetic signal and the reception of the second electromagnetic signal multiple times. The method further includes identifying, based on the repeated transmissions and receptions, a time-of-flight associated with a travel time for one of the electromagnetic signals to travel between the first and second nodes. The time-of-flight is indicative of a distance between the nodes.

20 Claims, 6 Drawing Sheets

(56) References Cited

U.S. PATENT DOCUMENTS

| | | | |
|---|---|---|---|
| 9,793,955 B2 | 10/2017 | Henry et al. | |
| 9,800,327 B2 | 10/2017 | Gerszberg et al. | |
| 9,831,912 B2 | 11/2017 | Henry et al. | |
| 9,860,075 B1 | 1/2018 | Gerszberg et al. | |
| 9,866,309 B2 | 1/2018 | Bennett et al. | |
| 9,876,264 B2 | 1/2018 | Barnickel et al. | |
| 9,893,795 B1 | 2/2018 | Henry et al. | |
| 9,904,535 B2 | 2/2018 | Gross et al. | |
| 9,913,139 B2 | 3/2018 | Gross et al. | |
| 9,935,703 B2 | 4/2018 | Bennett et al. | |
| 9,967,173 B2 | 5/2018 | Gross et al. | |
| 9,973,940 B1 | 5/2018 | Rappaport | |
| 9,999,038 B2 | 6/2018 | Barzegar et al. | |
| 10,020,844 B2 | 7/2018 | Bogdan et al. | |
| 10,027,397 B2 | 7/2018 | Kim | |
| 10,090,594 B2 | 10/2018 | Henry et al. | |
| 10,168,695 B2 | 1/2019 | Barnickel et al. | |
| 10,178,445 B2 | 1/2019 | Lubranski et al. | |
| 2006/0155508 A1* | 7/2006 | Choi | G01S 5/186 702/150 |
| 2009/0231958 A1* | 9/2009 | Wei | G01S 11/14 367/118 |
| 2011/0026363 A1* | 2/2011 | Lavache | G01S 11/16 367/127 |
| 2014/0160880 A1* | 6/2014 | King | H04B 11/00 367/2 |
| 2015/0247916 A1* | 9/2015 | Bartov | G01S 5/02585 455/456.6 |
| 2017/0361726 A1 | 12/2017 | Widmer et al. | |
| 2018/0156616 A1 | 6/2018 | Bennett et al. | |
| 2018/0219869 A1* | 8/2018 | Kumar | H04W 4/025 |
| 2018/0239008 A1* | 8/2018 | Han | G01S 19/38 |
| 2019/0170785 A1 | 6/2019 | Riccardi et al. | |
| 2019/0181532 A1 | 6/2019 | Vannucci et al. | |

OTHER PUBLICATIONS

Office Action dated Jul. 2, 2020 in connection with U.S. Appl. No. 16/525,294, 10 pages.

Office Action dated Apr. 17, 2020 in connection with U.S. Appl. No. 16/525,294, 15 pages.

Atherton, "The Army wants drones that make their own networks," Sightline Media Group, Jan. 2019, 4 pages.

"CyPhy Works aims to bring drones to agriculture, mining, public safety sectors," Boston Business Journal, Oct. 2015, 3 pages.

Guillen-Perez et al., "Flying Ad Hoc Networks: A New Domain for Network Communications," Sensors 2018, Sep. 2018, 23 pages.

"Scholar: Ranging & Localization," Humatics, Data Sheet, Mar. 2019, 1 page.

McNeil, "CyPhy Works' new drone takes off on Kickstarter," Directions Media, Jun. 2015, 3 pages.

Nandakumar et al., "3D Localization for Sub-Centimeter Sized Devices," Association for Computing Machinery, SenSys '18, Nov. 2018, 12 pages.

"UWB localization techniques—TOF and TDOA," Nanjing Woxu Wireless Co., Ltd., Apr. 2019, 3 pages.

"Ultra wideband (UWB) wireless AD hoc networks," Nanjing Woxu Wireless Co., Ltd., Apr. 2019, 3 pages.

"PARC: The Tethered Drone," Aria Insights, Specification Sheet, Version PN15534-01/D, Jan. 2019, 2 pages.

Riley, "A High-Resolution Time Interval Counter Using the TAPR TADD-2 and TICC Modules," Hamilton Technical Services, Mar. 2017, 9 pages.

"PulsON 440 Data Sheet / User Guide," Time Domain, 320-031TD, May 2017, 78 pages.

"PulsON 440 Operation Description / Theory of Operation," Time Domain, Dec. 2015, 9 pages.

"Intelligent Transportation based UWB Positioning and Connectivity," University at Albany—SUNY, Signals & Networks Lab, Apr. 2018, 34 pages.

Yavuz et al., "A new multi-tier adaptive military MANET security protocol using hybrid cryptography and signcryption," Turk J. Elec. Eng. & Comp. Sci., vol. 18, No. 1, 2010, 21 pages.

U.S. Appl. No. 16/525,221 entitled "One-Way Time-of-Flight Localization Using Sonic and Electromagnetic Signals for Mobile Ad Hoc Networks," Jul. 29, 2019, 37 pages.

U.S. Appl. No. 16/525,294 entitled "Localization Using Signals Transmitted Over Different Signal Paths for Mobile Ad Hoc Networks," Jul. 29, 2019, 41 pages.

Shi et al., "Design on Hybrid RFID Ultrasound Based 2D Indoor Positioning System," Thesis, Department of Electrical Engineering, Blekinge Institute of Technology, 2013, 62 pages.

Applicant-Initiated Interview Summary dated Jul. 8, 2022 in connection with U.S. Appl. No. 16/525,221, 4 pages.

Non-Final Office Action dated May 6, 2022 in connection with U.S. Appl. No. 16/525,221, 13 pages.

* cited by examiner

LOCALIZATION USING REPEATED TRANSMISSIONS OF ELECTROMAGNETIC SIGNALS FOR MOBILE AD HOC NETWORKS

TECHNICAL FIELD

This disclosure generally relates to communication systems. More specifically, this disclosure relates to localization using repeated transmissions of electromagnetic signals for mobile ad hoc networks.

BACKGROUND

A mobile ad hoc network or "MANET" generally refers to a communication network in which autonomous nodes communicate wirelessly and are often able to move independently. There is typically no previously-defined infrastructure or architecture for a mobile ad hoc network. As a result, the nodes in the network can often arrange and re-arrange themselves in various ways, and the arrangement of the nodes typically varies over time.

SUMMARY

This disclosure provides localization using repeated transmissions of electromagnetic signals for mobile ad hoc networks.

In a first embodiment, a method includes transmitting a first electromagnetic signal from a first node to a second node and receiving a second electromagnetic signal from the second node at the first node. The method also includes repeating the transmission of the first electromagnetic signal and the reception of the second electromagnetic signal multiple times. The method further includes identifying, based on the repeated transmissions and receptions, a time-of-flight associated with a travel time for one of the electromagnetic signals to travel between the first and second nodes. The time-of-flight is indicative of a distance between the nodes.

In a second embodiment, an apparatus includes a first node, which includes a transmitter, a receiver, and a controller. The transmitter is configured to repeatedly transmit a first electromagnetic signal to a second node, and the receiver is configured to repeatedly receive a second electromagnetic signal from the second node. The controller is configured to identify, based on the repeated transmissions and receptions, a time-of-flight associated with a travel time for one of the electromagnetic signals to travel between the first and second nodes. The time-of-flight is indicative of a distance between the nodes.

In a third embodiment, an apparatus includes a second node, which includes a receiver, a transmitter, and a controller. The receiver is configured to repeatedly receive a first electromagnetic signal from a first node, and the transmitter is configured to repeatedly transmit a second electromagnetic signal to the first node. The controller is configured to determine that the first node is attempting to identify, based on the repeated transmissions and receptions, a time-of-flight associated with a travel time for one of the electromagnetic signals to travel between the first and second nodes and to control the receiver and the transmitter based on the determination. The time-of-flight is indicative of a distance between the nodes.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, a mobile ad hoc network (MANET) refers to a communication network in which autonomous nodes communicate wirelessly and are often able to move independently, so the arrangement of the nodes typically varies over time. In some cases, it may be necessary or desirable to operate the nodes in a mobile ad hoc network as a coherent distributed array, which means that the operations of the nodes are coherently coordinated so that the nodes perform specific operations as a single system. The ability to operate nodes in a mobile ad hoc network coherently can provide various advantages depending on the implementation and application. For example, operating the nodes in a mobile ad hoc network coherently may allow the nodes to collectively create a high-gain synthetic aperture directional antenna.

The formation of a coherent distributed but mobile array of nodes often requires both localization of the nodes and timing synchronization of the nodes. However, these functions can be difficult or costly to perform in various circumstances and for various reasons. For example, two-way time-of-flight techniques are often used in which a signal is transmitted from a first node to a second node, reflected from the second node, and received back at the first node. A distance between the nodes can then be estimated by multiplying the round-trip time of the signal by the speed of the signal and dividing the result by two.

Unfortunately, two-way time-of-flight techniques often use radio frequency (RF) or other electromagnetic signals, and these signals travel at the speed of light (approximately $2.998 \times 10^8$ meters per second) in free space. Identifying the round-trip time of a signal traveling at that speed requires the use of a very precise clock source, such as a clock source having a pico-second accuracy, which can be relatively expensive. The use of less accurate (and cheaper) clock sources may introduce large errors into the calculated distances between the nodes. Also, two-way time-of-flight techniques that rely on reflection of a signal can suffer from problems associated with low reflection area or poor reflection characteristics. Further, two-way time-of-flight techniques that rely on reflection can experience multi-path problems in which a transmitted signal is reflected from multiple objects or from an incorrect object (not just an object of interest), which can cause an erroneous distance to be calculated. In addition, two-way time-of-flight techniques often suffer from $1/r^4$ losses, where r represents the distance between the nodes. This means that an electromagnetic signal rapidly weakens as the distance between the nodes increases, which can limit the range of these techniques.

One overriding problem here is that many ranging systems involve "uncooperative" ranging since one node (often a target) does not voluntarily wish to participate in or cannot participate in ranging operations. For example, RADAR and LIDAR systems are often used for target detection, and the target may not wish to be located or to participate in ranging. As another example, laser range-finders are often used to identify distances to objects, and those objects typically cannot participate in range-finding operations (other than to passively reflect laser energy). As yet another example, sonic robotic sensors are often used to identify nearby walls or other obstacles, and those obstacles typically cannot participate in sensing operations (other than to passively reflect sonic energy).

This disclosure provides various techniques for time-of-flight localization in mobile ad hoc networks. As described in more detail below, nodes are configured to engage in "cooperative" ranging in which two or more nodes cooperate to perform ranging in support of localization and optionally timing synchronization using time-of-flight measurements. For example, RF or other electromagnetic signals can be repeatedly transmitted back-and-forth between a first node and a second node, possibly a large number of times (such as one thousand times or more). An average time-of-flight for each individual electromagnetic signal to travel between the nodes (such as a one-way or two-way time-of-flight) can then be determined and used for localization.

In these embodiments, the time required for one electromagnetic signal to travel between first and second nodes may be extremely small and therefore extremely hard to measure accurately. However, it is much easier to count the number of times that transmissions of electromagnetic signals occur within a larger specified time period or to measure the amount of time needed for a specified number of transmissions of electromagnetic signals between the nodes. These approaches essentially "increase" the distance between the two nodes so that the time required for electromagnetic signals to travel between the nodes can be more easily measured.

These approaches allow a distance between two nodes to be calculated without requiring clock synchronization between the nodes, since the average time-of-flight for the electromagnetic signals can be determined using a single clock source at a single one of the nodes. Also, since the average time-of-flight of multiple electromagnetic signals (rather than the time-of-flight of a single electromagnetic signal) is used, a less accurate clock source can be used for time-of-flight measurements, although a higher-accuracy clock source may still be used. Further, at least one electromagnetic signal can be used to help support synchronization or re-synchronization of clock sources used in different nodes, which allows timing synchronization functionality to be incorporated into localization functionality. It should be noted, however, that this feature is optional since one node need not have a synchronized clock (or any clock for that matter) for the localization functionality described here to operate. Moreover, some embodiments of these approaches avoid reliance on signal reflections, helping to avoid low or poor reflection problems, $1/r^4$ losses, and multi-path problems even when nodes are used indoors. In addition, these approaches can obtain accurate position measurements (such as with centimeter or millimeter accuracy) at longer distances, enabling nodes to be arranged in a coherent array and support desired functionality. As a particular example, these techniques may allow nodes in a mobile ad hoc network to be configured to function as a large synthetic aperture antenna for beamforming and to provide fast steering, high gain, and high azimuthal precision.

Figure 1:
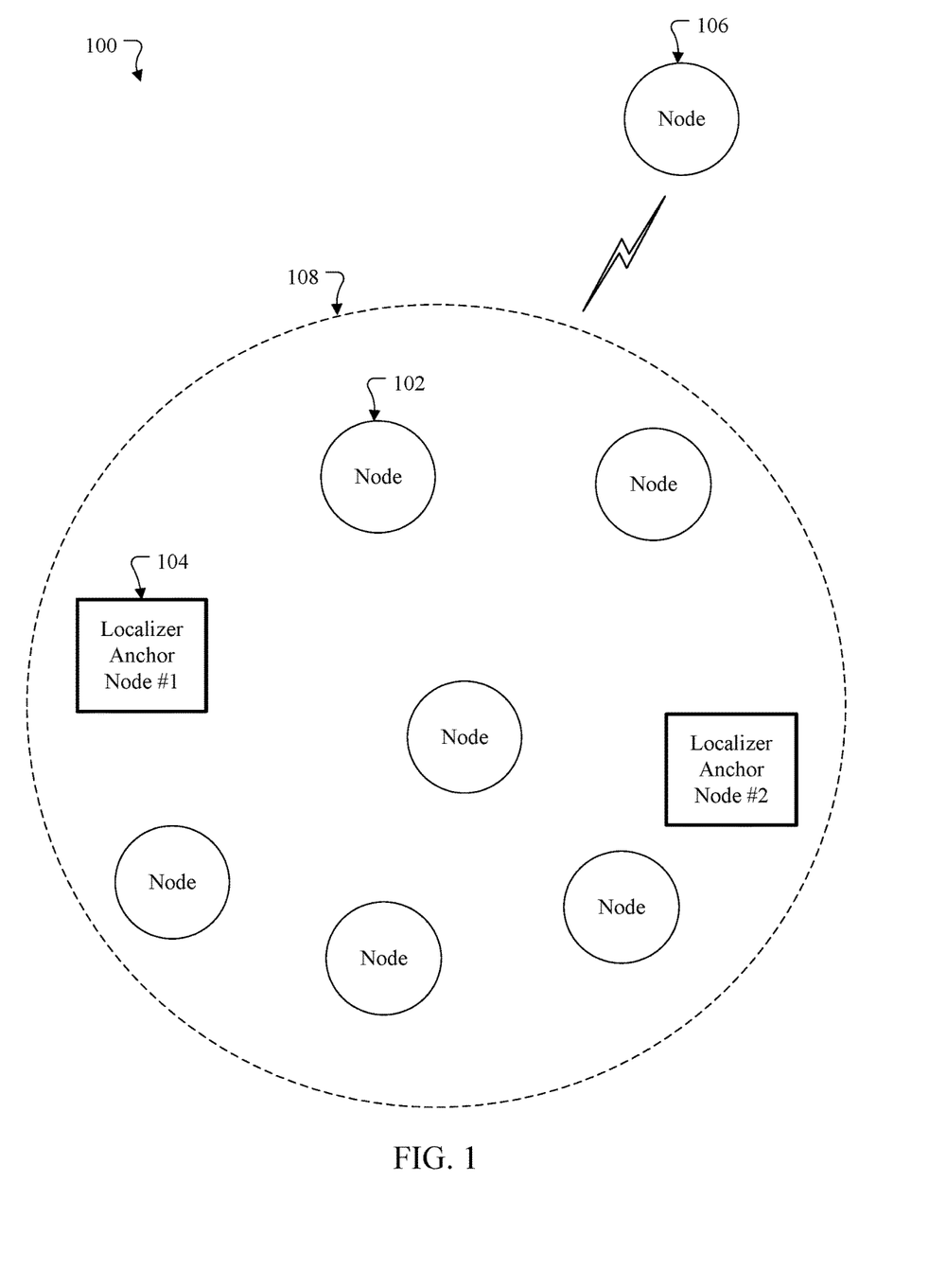
FIG. 1 illustrates an example system supporting time-of-flight localization for mobile ad hoc networks in accordance with this disclosure.

FIG. 1 illustrates an example system 100 supporting time-of-flight localization for mobile ad hoc networks in accordance with this disclosure. As shown in FIG. 1, the system 100 generally includes various mobile or other communication nodes 102 and one or more anchor nodes 104. Each communication node 102 generally represents a node that can communicate with the one or more anchor nodes 104 and that can be localized through interactions with the anchor nodes 104. Each communication node 102 may optionally also engage in wireless communications with at least one more-distant node 106. For example, as described in more detail below, the communication nodes 102 may be operated coherently to provide beamforming or other coherent operations involving the more-distant nodes 106.

At least some of the communication nodes 102 are mobile, which means that the layout of the communication nodes 102 may vary over time. In order to support localization, the communication nodes 102 are configured to engage in various communications with the anchor nodes 104 in order to help localize the communication nodes 102. This allows at least some of the nodes 102, 104 to identify the locations of the communication nodes 102 with relatively high accuracy. The same communications or different communications may also optionally be used to support timing synchronization of the communication nodes 102, such as relative to a clock source used by one or more anchor nodes 104. Each of the communication nodes 102 includes any suitable structure configured to engage in wireless communications with other devices and to engage in communications to support localization and optionally timing synchronization as described in more detail below.

Each anchor node 104 generally represents a node that can communicate with one or more communication nodes 102 and possibly with other anchor nodes 104 to help localize and optionally synchronize the communication nodes 102, such as to support coherent operation of the communication nodes 102. As described in more detail below, electromagnetic signals are repeatedly communicated back-and-forth between the communication nodes 102 and the anchor nodes 104 to support time-of-flight calculations. In this document, an "electromagnetic" signal generally refers to an electromagnetic field propagating through space, typically at the speed of light in free space. Depending on the implementation, an electromagnetic signal may include radio waves, microwaves, infrared light, visible light, ultraviolet light, or other electromagnetic radiation.

In some embodiments, each anchor node 104 may have a fixed position during operation of the communication nodes 102. The anchor nodes 104 in these embodiments may still be portable to some degree, but the anchor nodes 104 may maintain fixed positions during operation of the communication nodes 102. In other embodiments, each anchor node 104 may not have a fixed position during operation of the communication nodes 102. As a result, these anchor nodes 104 may move during operation of the communication nodes 102, which may be permissible if, for example, each anchor node 104 can repeatedly localize the communication nodes 102. In any of these embodiments, each anchor node 104 may include a suitable subsystem for accurately identifying its own location, such as a Global Positioning System (GPS) receiver or other Global Navigation Satellite System (GNSS) receiver. Each of the anchor nodes 104 includes any suitable structure configured to engage in wireless communications with other devices and to localize and optionally synchronize at least some of those other devices as described in more detail below.

Each node 106 represents any suitable device that communicates with at least one of the communication nodes 102 or anchor nodes 104. For example, a node 106 may represent a distant or covert receiver designed to receive beamformed transmissions from communication nodes 102 that are acting as a coherent beamforming system. Note that while a single node 106 is shown here, the system 100 may include any suitable number of nodes 106, and each node 106 may have any suitable position relative to the other nodes 102, 104 of the system 100.

The nodes 102, 104, 106 here can use any suitable signals to communicate with one another. For example, in some embodiments, at least some of the nodes 102, 104, 106 may use RF signals in the high frequency (HF) band (generally about 3 MHz to about 30 MHz), in the very high frequency (VHF) band (generally about 30 MHz to about 300 MHz), or in the ultra-high frequency (UHF) band (generally about 300 MHz to about 3 GHz), although other frequencies or frequency bands may also be used. As described below, the localization functionality provided in the system 100 may be used to resolve the positions of the communication nodes 102 with very high accuracy, such as with centimeter or millimeter accuracy. In some embodiments, each communication node 102 can be localized to at least one-tenth of the wavelength used by the communication node 102 for communications, including wavelengths used for HF, VHF, or UHF communications. Thus, for instance, a node 102 communicating at a 73-centimeter wavelength in the UHF band may be localized with an accuracy of about 7.3 centimeters or less. Note, however, that the localization approaches described in this patent document may obtain accuracies much better than one-tenth of the wavelength used for communications, depending on the wavelength.

There are various ways in which the system 100 may be implemented or deployed, depending on the application or use case. For example, in some embodiments, the communication nodes 102 may represent devices carried by personnel (such as in or on their clothing, backpacks, or helmets) or on ground vehicles in a given area, and the anchor nodes 104 may represent devices carried by other personnel, devices carried on other ground vehicles, or devices situated in other ground-based locations. In other embodiments, the communication nodes 102 may represent devices carried on drones, unmanned aerial systems (UASs), or other flight vehicles, and the anchor nodes 104 may represent devices carried on ground vehicles or devices situated in ground-based locations. As a particular example, the communication nodes 102 may be implemented using drones that can achieve an altitude of about four hundred feet to about one thousand feet or more, and one or more anchor nodes 104 may be used on the ground. These approaches allow the system 100 to be used to form high-gain ground or aerial ad hoc networks that can be used for various purposes, such as capturing sensor measurements or other information over the local horizon. Note that these operations may occur continuously or on-demand, such as when drones are launched into the air to capture information and then returned to the ground once the desired information has been obtained. The ability to localize and synchronize multiple communication nodes 102 using one or more anchor nodes 104 may find use in a number of other implementations, as well.

The ability to organize the communication nodes 102 (and possibly the anchor nodes 104 if they participate) into a coherent array 108 can provide various benefits or advantages depending on the implementation. For example, a coherent array 108 may function to provide a large single antenna gain, which allows the resulting antenna formed using the nodes to transmit or receive signals at longer distances. As another example, a coherent array 108 may be harder to jam and therefore provide more resilient or reliable operation. As yet another example, a coherent array 108 may be used for azimuth scanning.

This functionality can therefore benefit its users in various ways. For example, this functionality can be used to help provide improved communication capabilities for first responders, armed forces personnel, or other personnel. This functionality can also be used to help improve ground-to-air communications between personnel on the ground and assets in the air. This functionality can further be used to help provide improved stand-off capabilities for personnel, such as when the system 100 can be used to help identify threats earlier or at larger distances. Moreover, this functionality can be used to help organize drone swarms in order to perform functions like "station keeping," where the drones are organized in a specific way and try to maintain that organization during flight. Beyond that, this functionality may be used to improve the operations of automated facilities (such as driver-less automated warehouses) or autonomous vehicles (such as driver-less passenger vehicles, buses, or other vehicles). In addition to these functional or operational benefits, the localization functionality described in this patent document can be achieved at significantly lower costs compared to conventional approaches such as ultra-wideband (UWB) localization. Various approaches for implementing the localization functionality (and optionally the synchronization functionality) to help form coherent arrays or perform other functions are described in more detail below.

Although FIG. 1 illustrates one example of a system 100 supporting time-of-flight localization for mobile ad hoc networks, various changes may be made to FIG. 1. For example, the system 100 may include any suitable numbers and arrangements of nodes 102, 104, 106. As particular examples, three anchor nodes 104 may be used to localize communication nodes 102 in two-dimensional (2D) space and optionally to synchronize the nodes, and four anchor nodes 104 may be used to localize communication nodes 102 in three-dimensional (3D) space and optionally to synchronize the nodes. Also, the specific arrangement of the communication nodes 102 shown in FIG. 1 can vary over time, and the communication nodes 102 may assume specific arrangements to support desired operations (such as relatively straight lines or generally circular or semi-circular arrangements).

Figure 2:
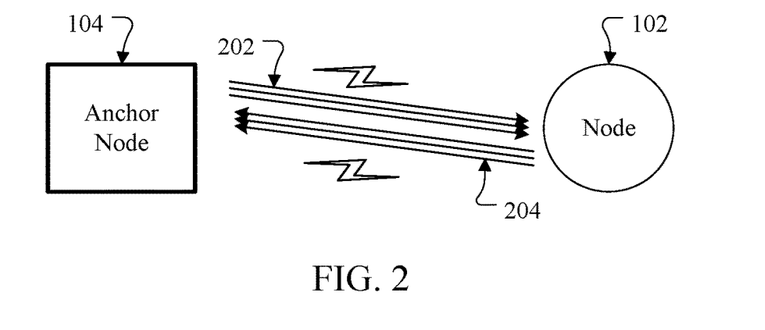
FIG. 2 illustrates example communications supporting time-of-flight localization for mobile ad hoc networks in accordance with this disclosure.

FIG. 2 illustrates example communications supporting time-of-flight localization for mobile ad hoc networks in accordance with this disclosure. In particular, FIG. 2 illustrates an example way in which electromagnetic signals may be used to support time-of-flight localization for mobile ad hoc networks. For ease of explanation, the communications shown in FIG. 2 are described as being used in the system 100 of FIG. 1. However, the communications shown in FIG. 2 may be used in any other suitable system.

As shown in FIG. 2, an anchor node 104 transmits an electromagnetic signal 202 (such as an RF signal) to a communication node 102. In some embodiments, when the communication node 102 receives and detects the electromagnetic signal 202, the communication node 102 transmits another electromagnetic signal 204 (such as an RF signal) back to the anchor node 104. In other embodiments, the communication node 102 reflects the electromagnetic signal 202 as the electromagnetic signal 204. In either case, both signals 202 and 204 travel at the speed of light. In order to facilitate easier measurement of the time-of-flight with a less-accurate clock source, this process can be repeated a large number of times, such as one thousand or multiple thousands of times. As a result, multiple electromagnetic signals 202 are sent from the anchor node 104 to the communication node 102, and multiple electromagnetic signals 202 are sent from the communication node 102 to the anchor node 104.

Given these signals 202 and 204, the anchor node 104 may start a timer upon transmission of the first electromagnetic signal 202 to the communication node 102, and the anchor node 104 may stop the timer once a specified number of electromagnetic signals 202 and 204 have been transmitted/received or after expiration of a specified time. The measured or specified time is reflective of the total combined time-of-flight for all of the electromagnetic signals 202 and 204 to travel between the communication node 102 and the anchor node 104. The measured or specified time also includes any (repeated) processing times of the communication node 102 and/or any (repeated) processing times of the anchor node 104. However, these processing times can typically be designed or determined by simple calibration with suitable accuracy to allow adjustment of the measured or specified time during which the electromagnetic signals 202 and 204 were transmitted/received in order to identify the actual combined time-of-flight for all of the electromagnetic signals 202, 204. The actual combined time-of-flight may then be divided by the number of electromagnetic signals 202 and 204 communicated between the nodes 102 and 104 to identify a time-of-flight for a single electromagnetic signal 202 or 204, and this value can be multiplied by the speed of light in order to identify the distance between the nodes 102, 104. Note, however, that the direction of communication in FIG. 2 may be reversed so that the communication node 102 initiates the communications and measures the combined time-of-flight.

One advantage of this approach is that clock sources in the two nodes 102, 104 do not need to be synchronized, and the clock source in only one of the two nodes 102, 104 may be used to measure a time-of-flight. That is, only one of the nodes 102, 104 may need to measure a period of time in order to capture a time-of-flight measurement. The other node need not have a synchronized clock source (or any clock source at all) in order for these functions to occur successfully. Also, the electromagnetic signals 202, 204 may be encoded with data, such as an identifier of the node transmitting the electromagnetic signal and/or location data (like a known location of the node transmitting the electromagnetic signal). The use of encoded data may allow, for instance, an anchor node 104 to inform a communication node 102 of its approximate position or to provide any other desired data to the communication node 102. Further, note that a single anchor node 104 may communicate with multiple communication nodes 102 and/or a single communication node 102 may communicate with multiple anchor nodes 104 during different localization operations. In order to support this, communications may be encoded, such as with specific device identifiers, in order to control which node is being localized. In addition, an anchor node 104 may communicate with different communication nodes 102 sequentially (or vice versa).

Although FIG. 2 illustrates one example of communications supporting time-of-flight localization for mobile ad hoc networks, various changes may be made to FIG. 2. For example, the numbers of electromagnetic signals 202, 204 may vary, such as based on the desired length of time in which the signals are transmitted and the distance between the nodes 102, 104. Also, the process shown in FIG. 2 may occur repeatedly in order to identify multiple combined times-of-flight, one-way or two-way times-of-flight, or distances, which can then be averaged or otherwise processed to identify a final combined time-of-flight, one-way or two-way time-of-flight, or distance.

Figure 3:
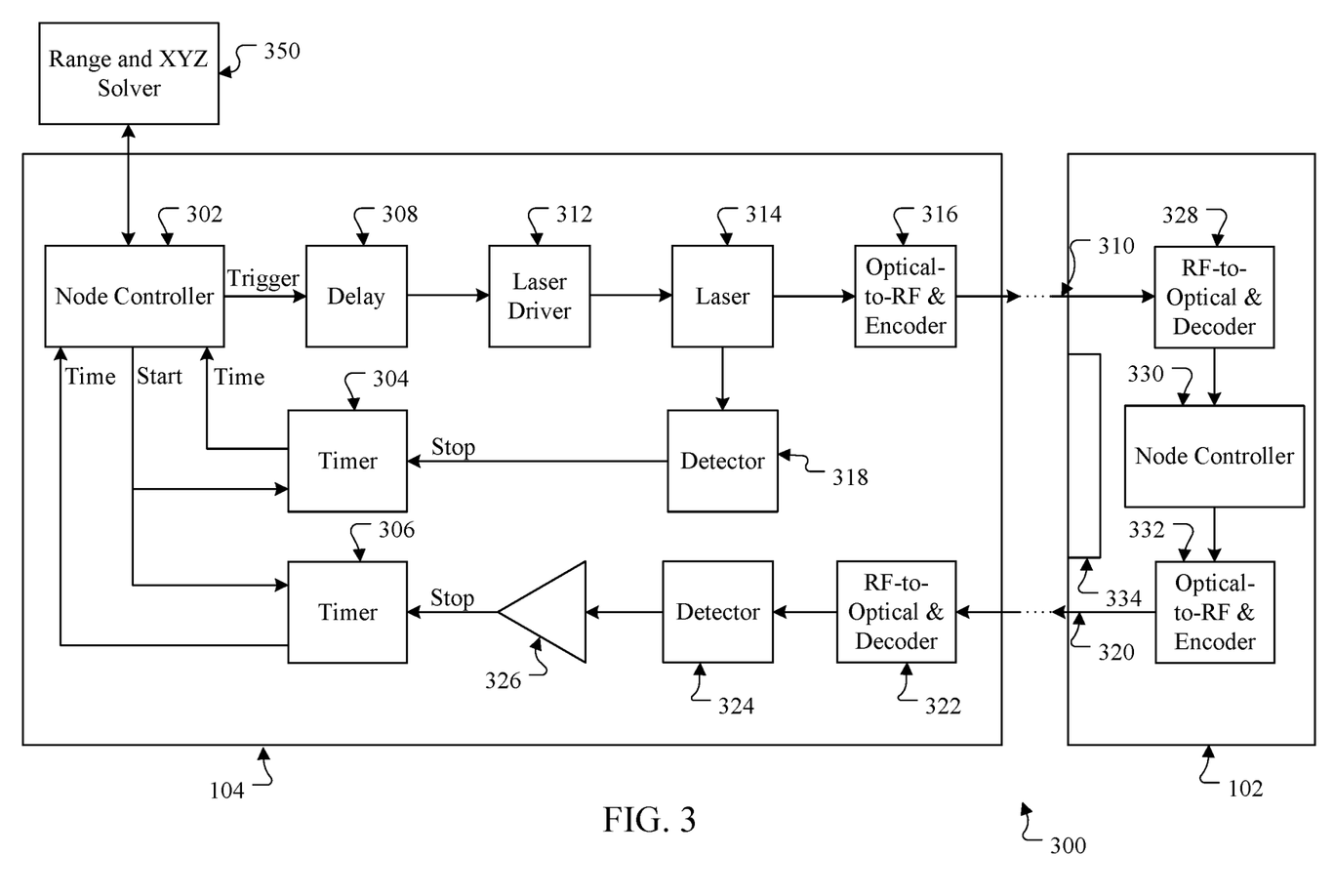
FIG. 3 illustrates an example architecture for devices supporting time-of-flight localization for mobile ad hoc networks in accordance with this disclosure.

FIG. 3 illustrates an example architecture 300 for devices supporting time-of-flight localization for mobile ad hoc networks in accordance with this disclosure. In particular, the architecture 300 in FIG. 3 shows an example implementation of an anchor node 104 and an example implementation of a communication node 102 supporting time-of-flight calculations. For ease of explanation, the architecture 300 of FIG. 3 is described as being used in the system 100 of FIG. 1 along with the communication scheme shown in FIG. 2. However, the architecture 300 of FIG. 3 may be used in any other suitable system and with any other suitable communication scheme.

As shown in FIG. 3, the anchor node 104 includes a node controller 302, which controls the overall operation of the anchor node 104. For example, the node controller 302 can generate a "start" signal that is provided to two timers 304 and 306 and a "trigger" signal that is provided to a delay unit 308. The timers 304 and 306 are used to capture time measurements, such as by measuring a period of time between receipt of the start signal from the node controller 302 and receipt of a "stop" signal from another component of the anchor node 104. Measurements captured using the timers 304, 306 may be provided to the node controller 302 for further processing and/or to an external component (such as a range and XYZ solver 350) that can process the measurements. The use of two timers 304, 306 here allows the time measured by the timer 304 to be subtracted from the time measured by the timer 306, thereby allowing at least part of the time for signal generation in the anchor node 104 to be removed when generating a time-of-flight measurement. The delay unit 308 is used to delay the trigger signal by a specified amount of time (such as 1.25 ms). The exact amount of delay can vary based on the circumstances, and the delay period can be used to help synchronize operation of the timers 304 and 306 with the transmission of an electromagnetic signal by other components of the anchor node 104. A delay period of zero may also be used during a "dedicated" node-to-node distance determination.

The node controller 302 includes any suitable structure configured to control various aspects of a node's operation, including the transmission and/or reception of various signals. For example, the node controller 302 may include one or more microprocessors, microcontrollers, digital signal processors (DSPs), field programmable gate arrays (FPGAs), application specific integrated circuits (ASICs), or discrete circuitry. Each timer 304, 306 includes any suitable structure configured to measure a time-of-flight, such as a TEXAS INSTRUMENTS TDC7200 time-to-digital converter. The delay unit 308 includes any suitable structure configured to delay a signal by a desired amount.

In this example, each of multiple electromagnetic signals 310 transmitted to a communication node 102 by the anchor node 104 is generated using a laser driver 312, a laser 314, and an optical-to-RF converter and encoder 316. The laser driver 312 generally operates to produce a drive signal based on the trigger signal provided by the node controller 302, where the drive signal is used to drive the laser 314. Precise control of the drive signal by the laser driver 312 allows precise control of the output optical beam generated by the laser 314. The laser driver 312 includes any suitable structure configured to generate a drive signal for a laser. The laser 314 includes any suitable structure configured to generate a laser output or other optical output, such as a laser diode.

The output from the laser 314 is used by the optical-to-RF converter and encoder 316 to generate an RF signal (an electromagnetic signal 310) that is transmitted to the communication node 102. For example, the optical-to-RF converter and encoder 316 can receive the laser output from the laser 314 and generate a corresponding RF signal based on the laser output. The optical-to-RF converter and encoder 316 can also modulate the RF output in a desired manner or otherwise encode data into the RF output. The optical-to-RF converter and encoder 316 includes any suitable structure configured to generate an RF signal based on an optical input and encode data, such as a BROADCOM AFBR-2310Z fiber optic receiver.

A small portion of the optical output from the laser 314 can be provided to an optical detector 318, which can detect a pulse or other output waveform generated by the laser 314. When a specified output waveform is detected, the optical detector 318 provides the stop signal to the timer 304, which causes the timer 304 to stop measuring a time and to provide its measured time to the node controller 302. The optical detector 318 includes any suitable structure configured to detect an optical signal, such as a photodiode or other photodetector.

Each of multiple electromagnetic signals 320 (such as RF signals) transmitted or otherwise provided by the communication node 102 is received at an RF-to-optical converter and decoder 322 of the anchor node 104. The RF-to-optical converter and decoder 322 converts an incoming RF signal into an optical signal. The RF-to-optical converter and decoder 322 can also demodulate the RF input in a desired manner or otherwise decode data from the RF input. The RF-to-optical converter and decoder 322 includes any suitable structure configured to generate an optical output based on an RF input and decode data, such as a BROADCOM AFBR-1310Z fiber optic transmitter.

The output of the RF-to-optical converter and decoder 322 is provided to an optical detector 324, which can detect a pulse or other output waveform generated by the RF-to-optical converter and decoder 322. When a specified output waveform is detected, the optical detector 324 provides a specified output to a transimpedance amplifier 326. The transimpedance amplifier 326 converts a current from the optical detector 324 into a voltage that represents the stop signal for the timer 306, which causes the timer 306 to stop measuring a time and to provide its measured time to the node controller 302. The optical detector 324 includes any suitable structure configured to detect an optical signal, such as a photodiode or other photodetector. The transimpedance amplifier 326 includes any suitable structure configured to convert a current into a voltage, such as an operational amplifier.

In some embodiments, the communication node 102 may include an RF-to-optical converter and decoder 328, a node controller 330, and an optical-to-RF converter and encoder 332. The RF-to-optical converter and decoder 328 converts RF signals (the electromagnetic signals 310) into optical signals, which may be further processed (such as by an optical detector) and then used by the node controller 330. The RF-to-optical converter and decoder 328 can also decode information contained in the electromagnetic signals 310. The node controller 330 can detect reception of an electromagnetic signal 310 and trigger transmission of an electromagnetic signal 320 in response. The optical-to-RF converter and encoder 332 converts optical signals (such as those generated by a laser or other optical source) into RF signals (the electromagnetic signals 320). The optical-to-RF converter and encoder 332 can also encode information into the electromagnetic signals 320.

The RF-to-optical converter and decoder 328 includes any suitable structure configured to generate an optical output based on an RF input and decode data, such as a BROADCOM AFBR-1310Z fiber optic transmitter. The node controller 330 includes any suitable structure configured to control various aspects of a node's operation, including the transmission and/or reception of various signals. For example, the node controller 330 may include one or more microprocessors, microcontrollers, DSPs, FPGAs, ASICs, or discrete circuitry. The optical-to-RF converter and encoder 332 includes any suitable structure configured to generate an RF signal based on an optical input and encode data, such as a BROADCOM AFBR-2310Z fiber optic receiver.

In these embodiments, the communication node 102 can receive an electromagnetic signal 310 from the anchor node 104, and the node controller 330 detects the receipt of the electromagnetic signal 310. In response, the node controller 330 initiates the transmission of an electromagnetic signal 320 to the anchor node 104. As noted above, repeating this process a large number of times allows estimation of a distance between the nodes 102, 104 based on an average time-of-flight.

In other embodiments, the communication node 102 may use a retroreflector 334 to reflect the electromagnetic signals 310 back to the anchor node 104 as the electromagnetic signals 320. While these embodiments might suffer from various problems described above (such as low reflection area, poor reflection characteristics, $1/r^4$ losses, or multi-path problems), this approach substantially eliminates the processing delays associated with the communication node 102. The retroreflector 334 includes any suitable structure configured to reflect electromagnetic energy back towards its source, such as a flat panel retroreflector like a Van Atta array.

The range and XYZ solver 350 generally operates to process one or more measured times, counted transmissions/receptions, combined time-of-flight measurements, or other data from the anchor node 104 in order to help localize one or more communication nodes 102. For example, the range and XYZ solver 350 may receive a time-of-flight measurement generated by the node controller 302 or receive timer/count values from the node controller 302 and calculate a time-of-flight measurement. The range and XYZ solver 350 can use the time-of-flight measurement and a speed of the electromagnetic signals 310, 320 to estimate a distance (range) to a communication node 102. The range and XYZ solver 350 may also use multiple distances (such as distances calculated by multiple anchor nodes 104 and provided to the range and XYZ solver 350 or distances calculated by the range and XYZ solver 350 based on information from multiple anchor nodes 104) to identify a location of the communication node 102, such as in 2D or 3D space. Distance measurements may be provided between the anchor nodes 104 in any suitable manner, such as via RF or other communications (and possibly via one or more of the communication nodes 102). The range and XYZ solver 350 may also use an angle of arrival (such as one determined using an antenna array) in combination with a measured distance to identify the location of the communication node 102. In general, any suitable technique may be used to localize at least one communication node 102 based on one or more time-of-flight measurements.

The range and XYZ solver 350 includes any suitable structure configured to generate or use time-of-flight measurements to identify a range and a position of at least one communication node 102. For example, the range and XYZ solver 350 may include one or more processing devices, such as one or more microprocessors, microcontrollers, DSPs, FPGAs, ASICs, or discrete circuitry. As a particular example, the range and XYZ solver 350 may include or implement a tracking extended Kalman filter (EKF) to process time-of-flight measurements, which can help to improve the accuracy of the distance/position estimates related to the communication node 102. Note that while the range and XYZ solver 350 is shown here as being a separate component from the node controller 302, these components 302 and 350 may be combined into a single functional unit.

In this example architecture, the anchor node 104 and the communication node 102 repeatedly transmit electromagnetic signals 310, 320 back-and-forth, possibly a large number of times (such as one thousand times or more). An average time-of-flight for each individual electromagnetic signal 310, 320 to travel between the nodes 102, 104 can then be determined and used for localization. During this process, each node 102, 104 can use the receipt of one of the signals 310, 320 to trigger the transmission of the next signal 320, 310.

In some embodiments, the anchor node 104 operates by having the node controller 302 generate initial trigger and start signals to initiate transmission of an electromagnetic signal 310, and the node controller 302 receives first measured times in response to receipt of an electromagnetic signal 320. As noted above, the time measured by the timer 304 can be subtracted from the time measured by the timer 306 to remove at least part of the anchor node's processing time from the time measured by the timer 306. The node controller 302 can then repeat this process a specified number of times to transmit a desired number of electromagnetic signals 310 to the communication node 102 and receive a desired number of electromagnetic signals 320 from the communication node 102. The node controller 302 uses the measurements from the timers 304 and 306 to generate an initial measure of the combined time-of-flight for all of the electromagnetic signals 310 and 320. The initial measure can be pre-processed, such as by removing any processing times of the communication node 102 and any additional processing times of the anchor node 104 in order to generate an actual measure of the combined time-of-flight for all of the electromagnetic signals 310 and 320. The actual measurement of the combined time-of-flight is divided by the specified number of transmissions and receptions of the electromagnetic signals 310 and 320 to identify an average time-of-flight for each individual electromagnetic signal 310 and 320. The node controller 302 may use the average time-of-flight to identify a range to the communication node 102, or the node controller 302 may provide the average time-of-flight to an external component (such as the range and XYZ solver 350). Note that the node controller 302 could alternatively provide timer measurements or information based on the timer measurements to the range and XYZ solver 350, which can then identify and use the average time-of-flight.

In other embodiments, the timers 304, 306 and the detector 318 can be omitted, and the anchor node 104 operates by having the node controller 302 repeatedly generate the trigger signal to initiate transmissions of the electromagnetic signals 310. The node controller 302 also increments a counter each time an electromagnetic signal 310 is triggered and/or each time the transimpedance amplifier 326 signals that an electromagnetic signal 320 has been received. This process may continue until the node controller 302 determines that a specified time period has elapsed (such as by using a timer within or coupled to the node controller 302). The specified time period represents an initial measure of the combined time-of-flight for all of the electromagnetic signals 310 and 320. The initial measure can be pre-processed, such as by removing any processing times of the communication node 102 and any processing times of the anchor node 104 in order to generate an actual measure of the combined time-of-flight for all of the electromagnetic signals 310 and 320. The actual measurement of the combined time-of-flight is divided by the counted number of transmissions and receptions of the electromagnetic signals 310 and 320 to identify an average time-of-flight for each individual electromagnetic signal 310 and 320. The node controller 302 may use the average time-of-flight to identify a range to the communication node 102, or the node controller 302 may provide the average time-of-flight to an external component (such as the range and XYZ solver 350). Note that the node controller 302 could alternatively provide timer measurements or information based on the timer measurements to the range and XYZ solver 350, which can then identify and use the average time-of-flight.

Although FIG. 3 illustrates one example of an architecture 300 for devices supporting time-of-flight localization for mobile ad hoc networks, various changes may be made to FIG. 3. For example, various components shown in FIG. 3 may be combined, further subdivided, rearranged, or omitted and additional components can be added according to particular needs. As a particular example, the structures of the anchor node 104 and the communication node 102 may be reversed if the communication node 102 triggers the anchor node 104 and measures time. Also, any other suitable techniques may be used to generate RF or other electromagnetic signals 310, 320, and optical-to-RF and RF-to-optical conversions may or may not be needed. In addition, while certain techniques have been described above for measuring time or counting transmissions/receptions of signals, it is possible for various techniques to be used that involve measuring time or counting communications of signals.

Figure 4:
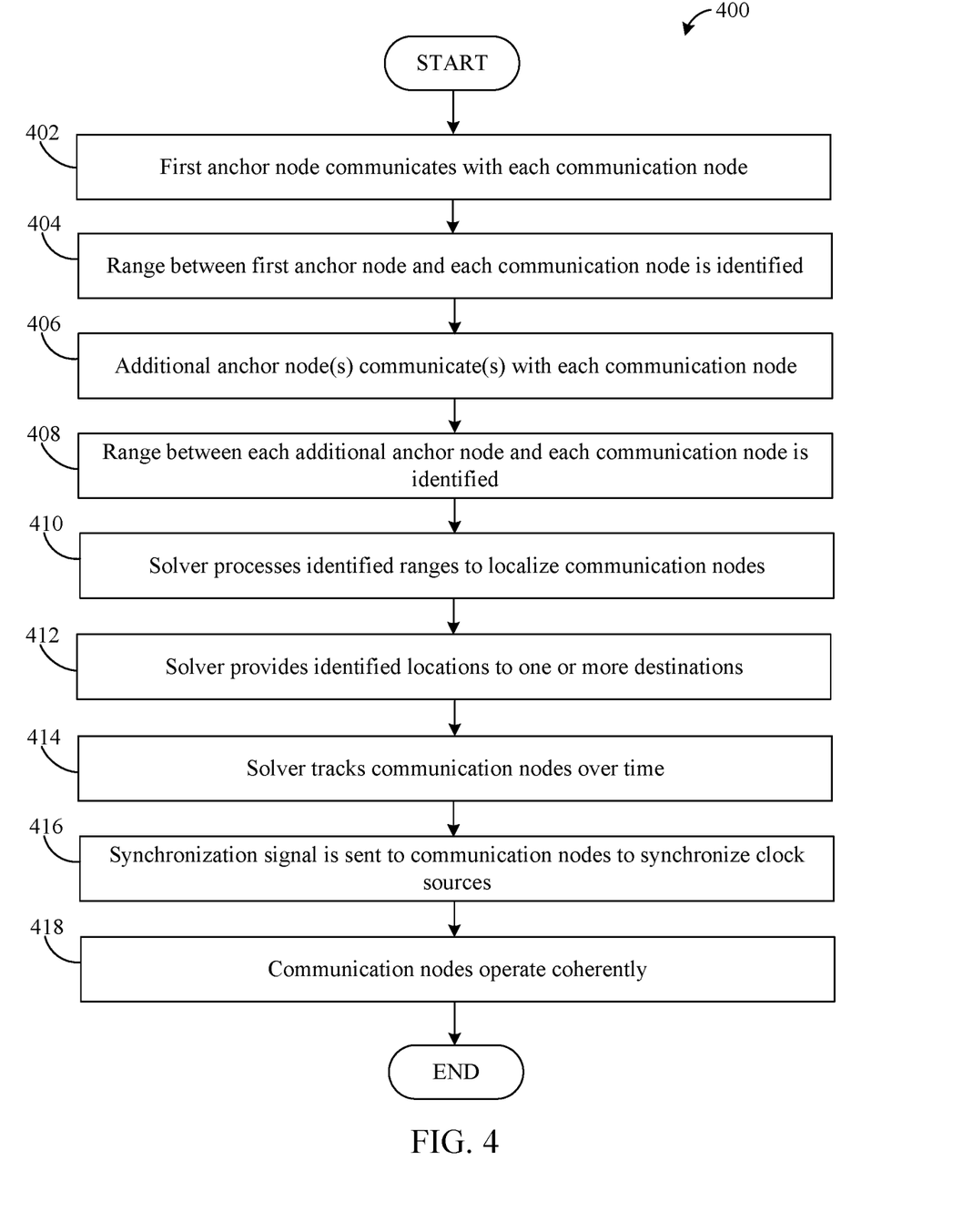
FIG. 4 illustrates an example method for localization in mobile ad hoc networks in accordance with this disclosure.

FIG. 4 illustrates an example method 400 for localization in mobile ad hoc networks in accordance with this disclosure. For ease of explanation, the method 400 may be described as involving the communication and anchor nodes 102, 104 of FIG. 1 supporting the communication scheme and technique shown in FIG. 2. However, the method 400 may involve the use of any other suitable nodes and any communication schemes and techniques implemented according to the teachings of this disclosure.

As shown in FIG. 4, a first anchor node communicates with each of one or more communication nodes at step 402, and a range between the first anchor node and each communication node is identified at step 404. This may include, for example, the first anchor node 104 and each communication node 102 exchanging multiple electromagnetic signals in a back-and-forth manner. This may also include the first anchor node 104 or each communication node 102 measuring a combined time-of-flight for all of the electromagnetic signals and dividing the combined time-of-flight by the number of electromagnetic signals to identify a time-of-flight for the electromagnetic signals. The range between the first anchor node 104 and each communication node 102 is based on the associated time-of-flight. Optionally, one or more additional anchor nodes may communicate with each of the one or more communication nodes at step 406, and a range between each additional anchor node and each communication node may be identified at step 408. These steps may occur in the same or similar manner as steps 402 and 404. Steps 406 and 408 are optional since, depending on the implementation, there may be a single anchor node 104 used with the one or more communication nodes 102.

A solver processes the identified ranges to localize each communication node at step 410. This may include, for example, a range and XYZ solver 350 obtaining one or more identified ranges from one or more anchor nodes 104 (although the solver 350 may form a part of at least one of the anchor nodes 104). This may also include the solver 350 using the identified range(s) and the known location(s) of one or more anchor nodes 104 to identify the location of each communication node 102 (such as via multilateration or other suitable technique). Various localization techniques are known in the art, and others are sure to be developed in the future.

Once the one or more communication nodes 102 have been localized, the location(s) of the communication node(s) 102 may be used in any suitable manner. For instance, the identified locations may be provided to one or more destinations at step 412, such as when the solver transmits the identified locations to the communication nodes 102, anchor nodes 104, or other nodes. This may allow, for example, the communication nodes 102 to alter their positions in order to obtain desired positions or a desired layout. The solver can track the location(s) of the communication node(s) over time at step 414. This may include, for example, the solver using extended Kalman filter tracking to improve the localization of each communication node 102 as time progresses. A synchronization signal can be sent to the one or more communication nodes in order to synchronize the clock source(s) of the communication node(s) at step 416. This may include, for example, an anchor node 104 or other device transmitting an RF or other electromagnetic signal to the communication nodes 102 in order to synchronize the clocks of the communication nodes 102. In addition, multiple communication nodes may operate in a coherent manner to provide desired functionality at step 418. This may include, for example, the communication nodes 102 operating to provide beamforming or to function as a high-gain synthetic aperture directional antenna.

Although FIG. 4 illustrates one example of a method 400 for localization in mobile ad hoc networks, various changes may be made to FIG. 4. For example, while shown as a series of steps, various steps in FIG. 4 may overlap, occur in parallel, occur in a different order, occur any number of times, or be omitted. As a particular example, the RF or other electromagnetic signal used for synchronization in step 416 may represent one of the electromagnetic signals transmitted during localization operations in one or more of steps 402-408. As another example, one or more locations of one or more nodes may be used in any other suitable manner, and this disclosure is not limited to using multiple nodes coherently based on the localization.

Figure 5:
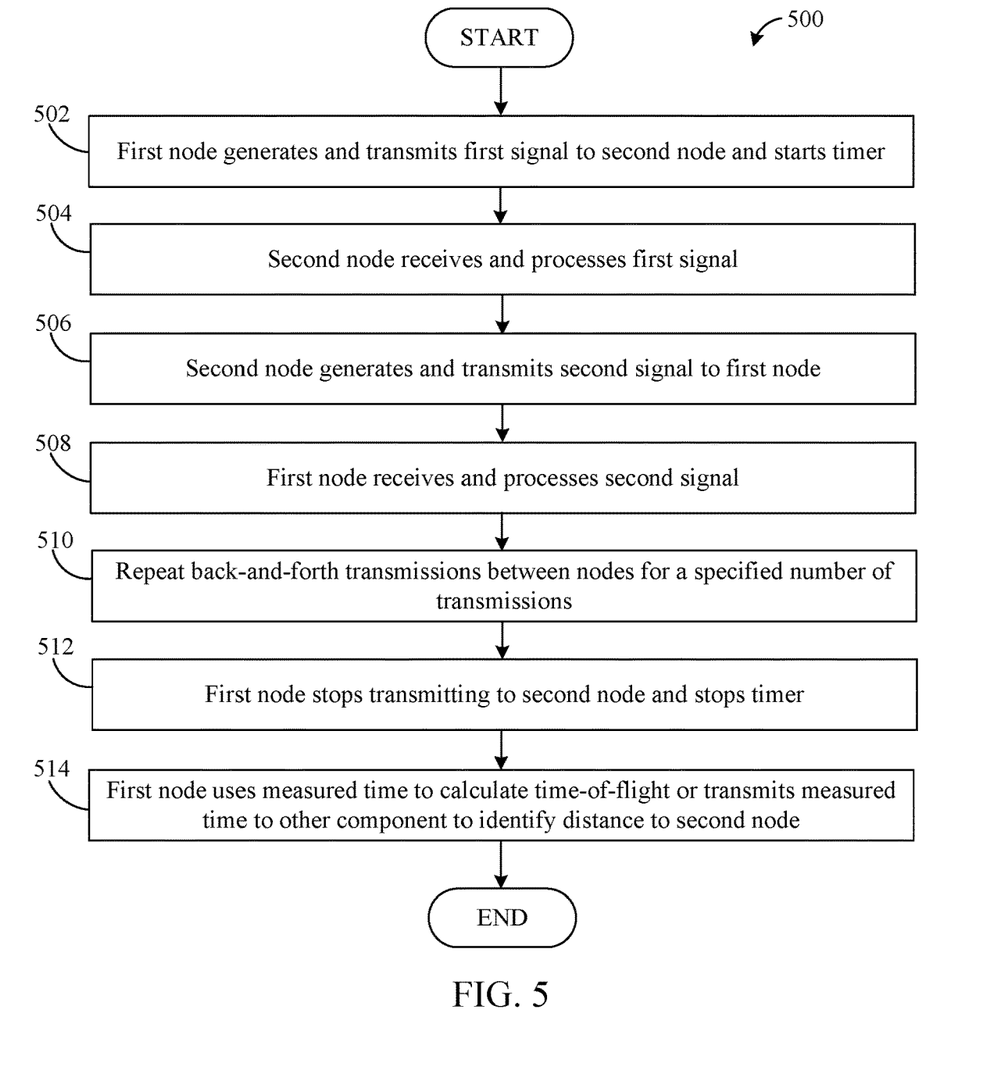
FIGS. 5 and 6 illustrate example methods for time-of-flight localization in mobile ad hoc networks in accordance with this disclosure.
Figure 6:
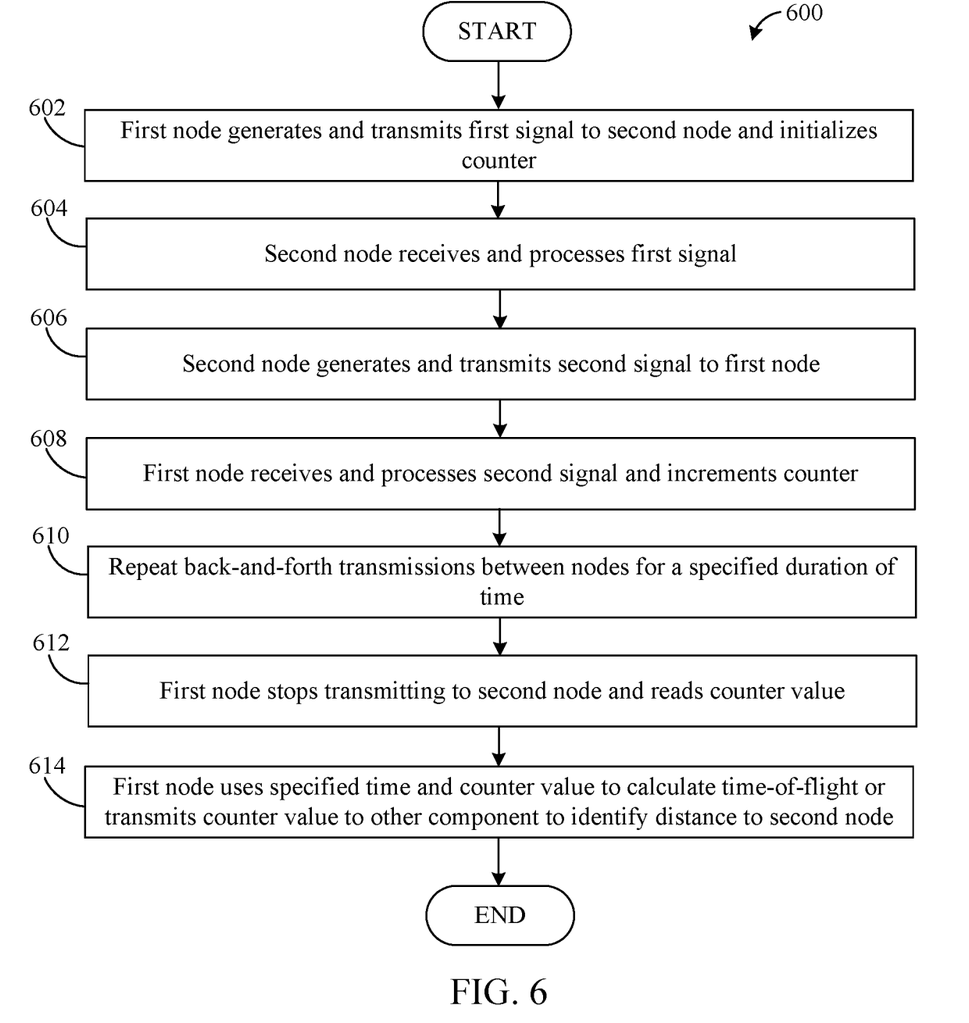

FIGS. 5 and 6 illustrate example methods 500 and 600 for time-of-flight localization in mobile ad hoc networks in accordance with this disclosure. In particular, FIGS. 5 and 6 illustrate example methods 500 and 600 for using electromagnetic signals to identify a range between two nodes (such as an anchor node 104 and a communication node 102). Either of the methods 500 and 600 may, for instance, be used in steps 402-404 and optionally steps 406-408 in the method 400 of FIG. 4. For ease of explanation, the methods 500 and 600 may be described as involving the communication and anchor nodes 102, 104 of FIG. 1 supporting the communication scheme and technique shown in FIG. 2. However, the methods 500 and 600 may involve the use of any other suitable nodes and communication schemes.

As shown in FIG. 5, a first node generates and transmits a first signal to a second node and starts a timer at step 502. This may include, for example, the node controller 302 of the first node causing the circuitry of the first node to generate an electromagnetic signal 202, 310 (such as an RF signal). This may also include the node controller 302 of the first node starting a timer when the first electromagnetic signal 202, 310 is transmitted. As noted above, the first node that is generating the electromagnetic signal 202, 310 may represent an anchor node 104 or a communication node 102.

A second node receives and processes the first signal at step 504 and generates and transmits a second signal at step 506. This may include, for example, the circuitry of the second node receiving the electromagnetic signal 202, 310. This may also include the node controller 330 of the second node determining that a response is needed based on data encoded in the received signal 202, 310 or based simply on the receipt of a specified signal 202, 310, such as by determining that the first node is attempting to identify a time-of-flight measurement based on the received signal. This may further include the node controller 330 of the second node causing the circuitry of the second node to generate an electromagnetic signal 204, 320 (such as an RF signal) based on that determination. As noted above, the second node that is generating the electromagnetic signal 204, 320 may represent a communication node 102 or an anchor node 104.

The first node receives and processes the second signal at step 508. This may include, for example, the circuitry of the first node receiving the electromagnetic signal 204, 320 and the node controller 302 detecting an indication of the signal from the circuitry. Back-and-forth communications of the electromagnetic signals are repeated at step 510, which generally involves repeating the transmission of the electromagnetic signals 202, 310 and the reception of the electromagnetic signals 204, 320. In some embodiments, this repeats until a specified number of electromagnetic signals have been communicated between the nodes 102, 104. At that point, the first node stops the timer at step 512. This may include, for example, the node controller 302 of the first node stopping the timer after one thousand, five thousand, or some other significantly large number of electromagnetic signals have been transmitted between the nodes 102, 104.

The first node uses the measured time to calculate a time-of-flight (which can be used to identify a distance to the second node), or the first node transmits the measured time to another component that uses the measured time to calculate a time-of-flight (which can be used to identify a distance to the second node) at step 514. This may include, for example, the node controller 302 of the first node dividing the measured time by the specified number of electromagnetic signals transmitted between the nodes 102, 104. The measured time can also be pre-processed, such as by subtracting the estimated processing time of the second node (for receiving and detecting the electromagnetic signals 202, 310 and transmitting the electromagnetic signals 204, 320) and the estimated processing time of the first node (for receiving and detecting the electromagnetic signals 204, 320 and transmitting the electromagnetic signals 202, 310). The estimated time-of-flight can be used to localize the second node with respect to the first node. In other embodiments, the measured time or the time-of-flight measurement can be provided to the range and XYZ solver 350, which localizes the second node with respect to the first node using the measured time or the time-of-flight measurement.

As shown in FIG. 6, a first node generates and transmits a first signal to a second node and initializes a counter at step 602. This may include, for example, the node controller 302 of the first node causing the circuitry of the first node to generate an electromagnetic signal 202, 310 (such as an RF signal). This may also include the node controller 302 of the first node setting a counter to a value of one or to a value of zero and incrementing the counter by one when the first electromagnetic signal 202, 310 is transmitted. As noted above, the first node that is generating the electromagnetic signal 202, 310 may represent an anchor node 104 or a communication node 102.

A second node receives and processes the first signal at step 604 and generates and transmits a second signal at step 606. This may include, for example, the circuitry of the second node receiving the electromagnetic signal 202, 310. This may also include the node controller 330 of the second node determining that a response is needed based on data encoded in the received signal 202, 310 or based simply on the receipt of a specified signal 202, 310, such as by determining that the first node is attempting to identify a time-of-flight measurement based on the received signal. This may further include the node controller 330 of the second node causing the circuitry of the second node to generate an electromagnetic signal 204, 320 (such as an RF signal) based on that determination. As noted above, the second node that is generating the electromagnetic signal 204, 320 may represent a communication node 102 or an anchor node 104.

The first node receives and processes the second signal and increments the counter at step 608. This may include, for example, the circuitry of the first node receiving the electromagnetic signal 204, 320 and the node controller 302 of the first node incrementing the counter by one upon detecting an indication of the signal from the circuitry. Back-and-forth communications of the electromagnetic signals are repeated at step 610, which generally involves repeating the transmission of the electromagnetic signals 202, 310 and the reception of the electromagnetic signals 204, 320. In some embodiments, this repeats until a specified amount of time has elapsed. At that point, the first node stops transmitting the electromagnetic signals to the second node and reads the counter value at step 612. This may include, for example, the node controller 302 of the first node reading the counter value after the specified amount of time has elapsed, during which time a significantly large number of electromagnetic signals have been transmitted between the nodes 102, 104.

The first node uses the specified time and the counter value to calculate a time-of-flight (which can be used to identify a distance to the second node), or the first node transmits the counter value to another component that uses the counter value to calculate a time-of-flight (which can be used to identify a distance to the second node) at step 614. This may include, for example, the node controller 302 of the first node, 104 dividing the specified time by the counter value. The specified time can also be pre-processed, such as by subtracting the estimated processing time of the second node (for receiving and detecting the electromagnetic signals 202, 310 and transmitting the electromagnetic signals 204, 320) and the estimated processing time of the first node (for receiving and detecting the electromagnetic signals 204, 320 and transmitting the electromagnetic signals 202, 310). The estimated time-of-flight can be used to localize the second node with respect to the first node. In other embodiments, the counter value or the time-of-flight measurement can be provided to the range and XYZ solver 350, which localizes the second node with respect to the first node using the counter value or the time-of-flight measurement.

Although FIGS. 5 and 6 illustrate examples of methods 500 and 600 for time-of-flight localization in mobile ad hoc networks, various changes may be made to FIGS. 5 and 6. For example, while shown as a series of steps, various steps in each figure may overlap, occur in parallel, occur in a different order, occur any number of times, or be omitted. Also, the processes shown in FIGS. 5 and 6 may occur repeatedly so that the results can be averaged, such as by identifying and averaging multiple times-of-flight or distances. Further, if retroflection is used at the second node (rather than active signal generation and transmission), steps 504-506 in FIG. 5 or steps 604-606 in FIG. 6 may be replaced by simply having the second node reflect the first signal as the second signal. As noted above, while subject to various problems, this would substantially eliminate processing delays associated with the second node. In addition, each determined time-of-flight or distance may be used in any suitable manner.

Figure 7:
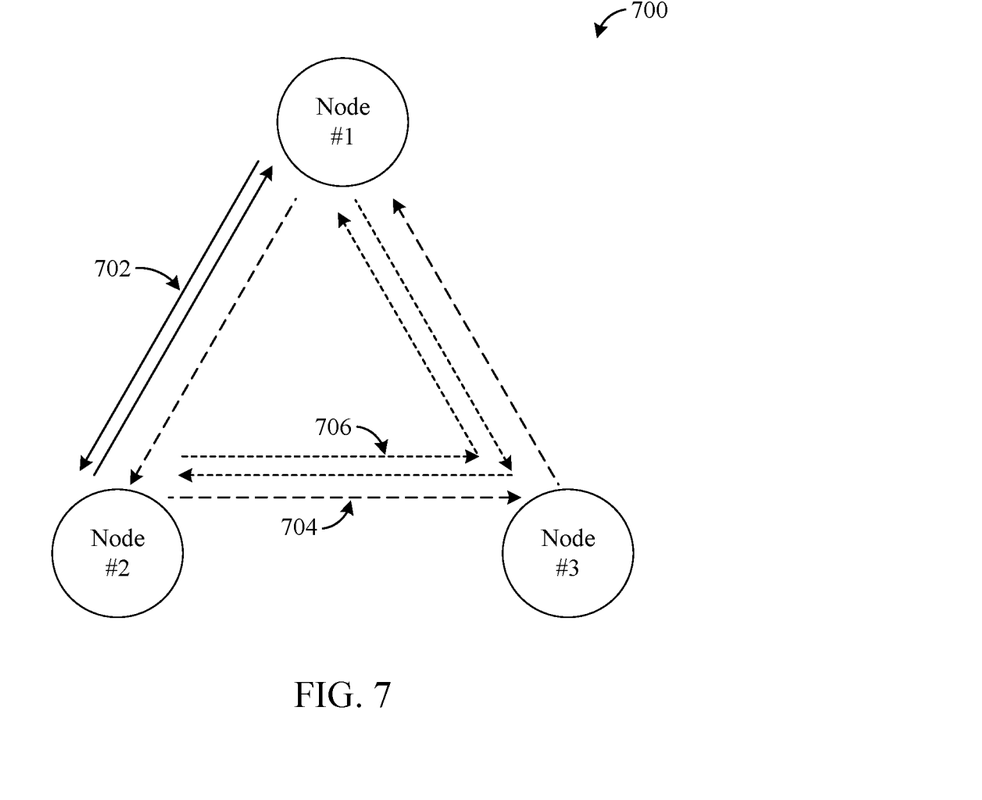
FIG. 7 illustrates an example technique for identifying a time delay associated with a node in a mobile ad hoc network in accordance with this disclosure.

FIG. 7 illustrates an example technique 700 for identifying a time delay associated with a node in a mobile ad hoc network in accordance with this disclosure. For ease of explanation, the technique 700 shown in FIG. 7 is described as being used in the system 100 of FIG. 1. However, the technique 700 shown in FIG. 7 may be used in any other suitable system.

As noted above, the processing time needed by a node 102 or 104 to receive and detect a signal and generate and transmit a response signal can be designed or determined in order to subtract that processing time from a time measurement generated by a timer or from a specified time. This is done in order to generate an accurate time-of-flight measurement. While it is often possible during manufacturing to place two nodes a known distance apart and transmit signals back-and-forth between the nodes to identify each node's processing time delay, this may not always be adequate. For instance, the time delay measured in a factory can drift over time or as environmental conditions change, which subsequently causes time or distance measurements to drift. As a particular example, extreme temperatures may cause processing times of nodes to vary.

As shown in FIG. 7, the technique 700 disclosed here can be used with three nodes denoted Node #1, Node #2, and Node #3. During a first set of communications 702, Node #1 transmits a signal to Node #2, and Node #2 responds by transmitting a signal back to Node #1. The amount of time between transmission of the signal to Node #2 and the reception of the signal from Node #2 can be measured at Node #1, such as with a timer of a node controller 302, 330.

This time may be denoted $T_{121}$. Note that these communications 702 may occur once, or the communications 702 may occur multiple times, such as in a back and forth fashion, so that multiple time measurements can be averaged to identify the time T12.

During a second set of communication 704, Node #1 transmits a signal to Node #2, Node #2 responds by transmitting a signal to Node #3, and Node #3 responds by transmitting a signal to Node #1. The amount of time between transmission of the signal to Node #2 and the reception of the signal from Node #3 can be measured at Node #1, such as with the timer of the node controller 302, 330. This time may be denoted $T_{1231}$. Note that these communications 704 may occur once, or the communications 704 may occur multiple times so that multiple time measurements can be averaged to identify the time $T_{1231}$.

During a third set of communication 706, Node #1 transmits a signal to Node #3, Node #3 responds by transmitting a signal to Node #2, Node #2 responds by transmitting a signal to Node #3, and Node #3 responds by transmitting a signal to Node #1. The amount of time between transmission of the signal to Node #3 and the reception of the signal from Node #3 can be measured at Node #1, such as with the timer of the node controller 302, 330. This time may be denoted $T_{13231}$. Note that these communications 706 may occur once, or the communications 706 may occur multiple times so that multiple time measurements can be averaged to identify the time $T_{13231}$.

Assuming all three nodes experience substantially the same processing time delay, the processing time associated with each node can be calculated using a formula of:

$$T_d = 2T_{1231} - T_{13231} - T_{121}$$

where $T_d$ represents the processing time delay common to all three nodes. Note that it is routine for multiple nodes to perform the same processing and number of calculations (even when some calculations are unnecessary or redundant) so that the nodes have substantially the same processing time delay. If nodes are not designed to perform the same processing and number of calculations, other techniques involving transmissions among the nodes may be used to identify the processing time delay of each node.

Note that the technique 700 shown in FIG. 7 can be repeated any number of times during operation of the nodes. For example, the processing time delays of the nodes may be determined continuously or repeatedly during operation of the nodes in order to account for drifts or other changes in the processing time delays of the nodes. This helps to increase the accuracy of the localization operations described above. The determined time delays here can be used by one or more communication nodes 102, one or more anchor nodes 104, the range and XYZ solver 350, or other component(s) to identify ranges between the nodes 102, 104.

Although FIG. 7 illustrates one example of a technique 700 for identifying a time delay associated with a node in a mobile ad hoc network, various changes may be made to FIG. 7. For example, any other suitable techniques may be used to identify processing time delays associated with nodes, including the use of one or more preprogrammed or other predefined processing time delays.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:
1. A method comprising:
transmitting a first electromagnetic signal from a first node to a second node;
receiving a second electromagnetic signal from the second node at the first node;

repeating the transmission of the first electromagnetic signal and the reception of the second electromagnetic signal multiple times; and identifying, based on the repeated transmissions and receptions, a time-of-flight of one of the electromagnetic signals based on dividing (i) a combined travel time for the electromagnetic signals to repeatedly travel between the first and second nodes by (ii) a number of the electromagnetic signals;

wherein the time-of-flight multiplied by a speed of the electromagnetic signals is indicative of a distance between the nodes.

2. The method of claim 1, wherein the transmissions and receptions of the first and second electromagnetic signals occur at least one thousand times in order to identify the time-of-flight.

3. The method of claim 1, wherein identifying the time-of-flight comprises:

starting a timer in response to a first transmission of the first electromagnetic signal;

stopping the timer in response to a specified number of transmissions of the first electromagnetic signal, a specified number of receptions of the second electromagnetic signal, or a specified number of transmissions of the first electromagnetic signal and receptions of the second electromagnetic signal, wherein the specified number of transmissions is two or more; and identifying the combined travel time based on a time measured by the timer.

4. A method comprising:

transmitting a first electromagnetic signal from a first node to a second node;

receiving a second electromagnetic signal from the second node at the first node;

repeating the transmission of the first electromagnetic signal and the reception of the second electromagnetic signal multiple times; and identifying, based on the repeated transmissions and receptions, a time-of-flight associated with a combined travel time for a plurality of the electromagnetic signals to repeatedly travel between the first and second nodes;

wherein the time-of-flight is indicative of a distance between the nodes; and wherein identifying the time-of-flight comprises:

counting a number of transmissions of the first electromagnetic signal, a number of receptions of the second electromagnetic signal, or a number of transmissions of the first electromagnetic signal and receptions of the second electromagnetic signal that occur within a specified time period; and identifying the time-of-flight based on the counted number.

5. The method of claim 1, further comprising:

repeatedly identifying a processing time delay associated with one or more of the nodes based on multiple time measurements, the multiple time measurements associated with different transmissions of signals between at least three nodes.

6. The method of claim 1, further comprising:

identifying a position of the first node or the second node based on the distance between the nodes.

7. The method of claim 1, further comprising:

identifying multiple distances between multiple pairs of nodes;

synchronizing clocks of at least two of the nodes; and coherently operating the at least two of the nodes.

8. The method of claim 1, further comprising:

synchronizing clocks of the first and second nodes using at least one of the electromagnetic signals.

9. An apparatus comprising:

a first node comprising:

a transmitter configured to repeatedly transmit a first electromagnetic signal to a second node;

a receiver configured to repeatedly receive a second electromagnetic signal from the second node; and a controller configured to identify, based on the repeated transmissions and receptions, a time-of-flight of one of the electromagnetic signals based on dividing (i) a combined travel time for the electromagnetic signals to repeatedly travel between the first and second nodes by (ii) a number of the electromagnetic signals;

wherein the time-of-flight multiplied by a speed of the electromagnetic signals is indicative of a distance between the nodes.

10. The apparatus of claim 9, wherein the controller is configured to identify the time-of-flight based on at least one thousand transmissions and receptions of the first and second electromagnetic signals.

11. The apparatus of claim 9, wherein, to identify the time-of-flight, the controller is configured to:

start a timer in response to a first transmission of the first electromagnetic signal;

stop the timer in response to a specified number of transmissions of the first electromagnetic signal, a specified number of receptions of the second electromagnetic signal, or a specified number of transmissions of the first electromagnetic signal and receptions of the second electromagnetic signal, wherein the specified number of transmissions is two or more; and identify the combined travel time based on a time measured by the timer.

12. The apparatus of claim 9, wherein, to identify the time-of-flight, the controller is configured to:

count a number of transmissions of the first electromagnetic signal, a number of receptions of the second electromagnetic signal, or a number of transmissions of the first electromagnetic signal and receptions of the second electromagnetic signal that occur within a specified time period in order to identify the number of the electromagnetic signals; and identify the time-of-flight based on the counted number.

13. The apparatus of claim 9, wherein the controller is further configured to repeatedly identify a processing time delay associated with one or more of the nodes based on multiple time measurements, the multiple time measurements associated with different transmissions of signals between at least three nodes.

14. The apparatus of claim 9, wherein the controller is further configured to identify a position of the first node or the second node based on the distance between the nodes.

15. The apparatus of claim 9, wherein the controller is further configured to:

identify multiple distances between multiple pairs of nodes;

synchronize clocks of at least two of the nodes; and coherently operate the at least two of the nodes.

16. The apparatus of claim 9, wherein the controller is further configured to synchronize clocks of the first and second nodes using at least one of the electromagnetic signals.

17. An apparatus comprising:
a second node comprising:
- a receiver configured to repeatedly receive a first electromagnetic signal from a first node;
- a transmitter configured to repeatedly transmit a second electromagnetic signal to the first node; and
- a controller configured to determine that the first node is attempting to identify a time-of-flight of one of the electromagnetic signals based on dividing (i) a combined travel time for the electromagnetic signals to repeatedly travel between the first and second nodes by (ii) a number of the electromagnetic signals and to control the receiver and the transmitter based on the determination;

wherein the time-of-flight multiplied by a speed of the electromagnetic signals is indicative of a distance between the nodes.

18. The apparatus of claim 17, wherein the time-of-flight is based on at least one thousand transmissions and receptions of the first and second electromagnetic signals.

19. The apparatus of claim 17, wherein the controller is further configured to repeatedly identify a processing time delay associated with one or more of the nodes based on multiple time measurements, the multiple time measurements associated with different transmissions of signals between at least three nodes.

20. The apparatus of claim 17, wherein the controller is further configured to synchronize clocks of the first and second nodes using at least one of the electromagnetic signals.

* * * * *